United States Patent
Hart et al.

(10) Patent No.: US 6,749,138 B2
(45) Date of Patent: Jun. 15, 2004

(54) GRANULATOR

(75) Inventors: Thomas S. Hart, Bowling Green, OH (US); Jack L. Ritchie, Bowling Green, OH (US)

(73) Assignee: Phoenix Technologies, L.P., Bowling Green, OH (US)

( * ) Notice: Subject to any disclaimer, the term of this patent is extended or adjusted under 35 U.S.C. 154(b) by 0 days.

(21) Appl. No.: 10/092,059

(22) Filed: Mar. 5, 2002

(65) Prior Publication Data

US 2003/0168537 A1 Sep. 11, 2003

(51) Int. Cl.⁷ .............................................. B02C 13/26
(52) U.S. Cl. .................. 241/73; 241/24.18; 241/24.28; 241/70; 241/72; 241/79; 241/186.5
(58) Field of Search .......................... 241/24.18, 24.28, 241/70, 72, 73, 79, 186.5

(56) References Cited

U.S. PATENT DOCUMENTS

| | | |
|---|---|---|
| 1,053,084 A | 2/1913 | Capen |
| 1,126,085 A | 1/1915 | Riisager |
| 1,139,651 A | 5/1915 | Easton |
| 1,279,355 A | 9/1918 | Kenner |
| 1,427,234 A | 8/1922 | Sherban |
| 1,824,681 A | 9/1931 | O'Neill |
| 1,867,523 A | 7/1932 | Omurei |
| 2,405,633 A | 8/1946 | Barker et al. |
| 2,471,043 A | 5/1949 | Schenck |
| 3,524,594 A | 8/1970 | Anderson et al. |
| 3,636,864 A * | 1/1972 | Loscialo ................ 100/91 |
| 4,030,670 A | 6/1977 | Abernathy |
| 4,044,695 A * | 8/1977 | Mackenzie et al. ......... 110/220 |
| 4,071,198 A * | 1/1978 | Tetreault ................ 241/73 |
| 4,117,984 A * | 10/1978 | Waxelbaum et al. ...... 241/73 |
| 4,245,999 A * | 1/1981 | Reiniger ................ 241/41 |
| 4,257,511 A * | 3/1981 | Miller ................... 194/209 |
| 4,281,801 A * | 8/1981 | Parker et al. ............ 241/222 |
| 4,341,353 A | 7/1982 | Hamilton et al. |
| 4,390,131 A * | 6/1983 | Pickrel ................... 241/1 |
| 4,635,862 A | 1/1987 | West et al. |
| 4,657,192 A | 4/1987 | Browning |
| 4,723,717 A | 2/1988 | Fagnant |
| 4,728,045 A | 3/1988 | Tomaszek |
| 5,000,644 A | 3/1991 | McBridge et al. |
| 5,060,875 A | 10/1991 | McBride |
| 5,071,075 A | 12/1991 | Wiens |
| 5,096,128 A | 3/1992 | Chang |
| 5,097,970 A | 3/1992 | Lamoureux |
| 5,184,780 A | 2/1993 | Wiens |
| 5,236,133 A * | 8/1993 | Lundquist .............. 241/19 |
| 5,297,746 A | 3/1994 | McBride |
| 5,547,136 A | 8/1996 | Steffens et al. |
| 5,558,281 A | 9/1996 | Bouldin |
| 5,871,161 A * | 2/1999 | Nishibori .............. 241/19 |
| 5,961,054 A | 10/1999 | Nishibori |
| 5,975,446 A | 11/1999 | Yaguchi et al. |
| 6,126,100 A * | 10/2000 | Barth et al. ............. 241/260.1 |
| 6,250,575 B1 | 6/2001 | White |
| 6,422,493 B1 * | 7/2002 | Simon et al. ........... 241/24.14 |
| 6,527,206 B1 * | 3/2003 | Wuebbels et al. ........ 241/19 |

FOREIGN PATENT DOCUMENTS

| | | |
|---|---|---|
| DE | 1 295 987 | 5/1969 |
| JP | 44-19665 | 8/1969 |
| JP | 60-26687 | 6/1985 |

* cited by examiner

*Primary Examiner*—William Hong
(74) *Attorney, Agent, or Firm*—MacMillan, Sobanski & Todd, LLC; Donald R. Fraser

(57) ABSTRACT

A granulator for reducing the size of plastic particles to facilitate the removal of contaminants therefrom. The granulator includes an upper chamber and a lower chamber defined by an exit screen. The upper chamber includes a rotary shear and an air handling system for creating a pressure drop across the screen to facilitate the transit of particulate material therethrough.

8 Claims, 3 Drawing Sheets

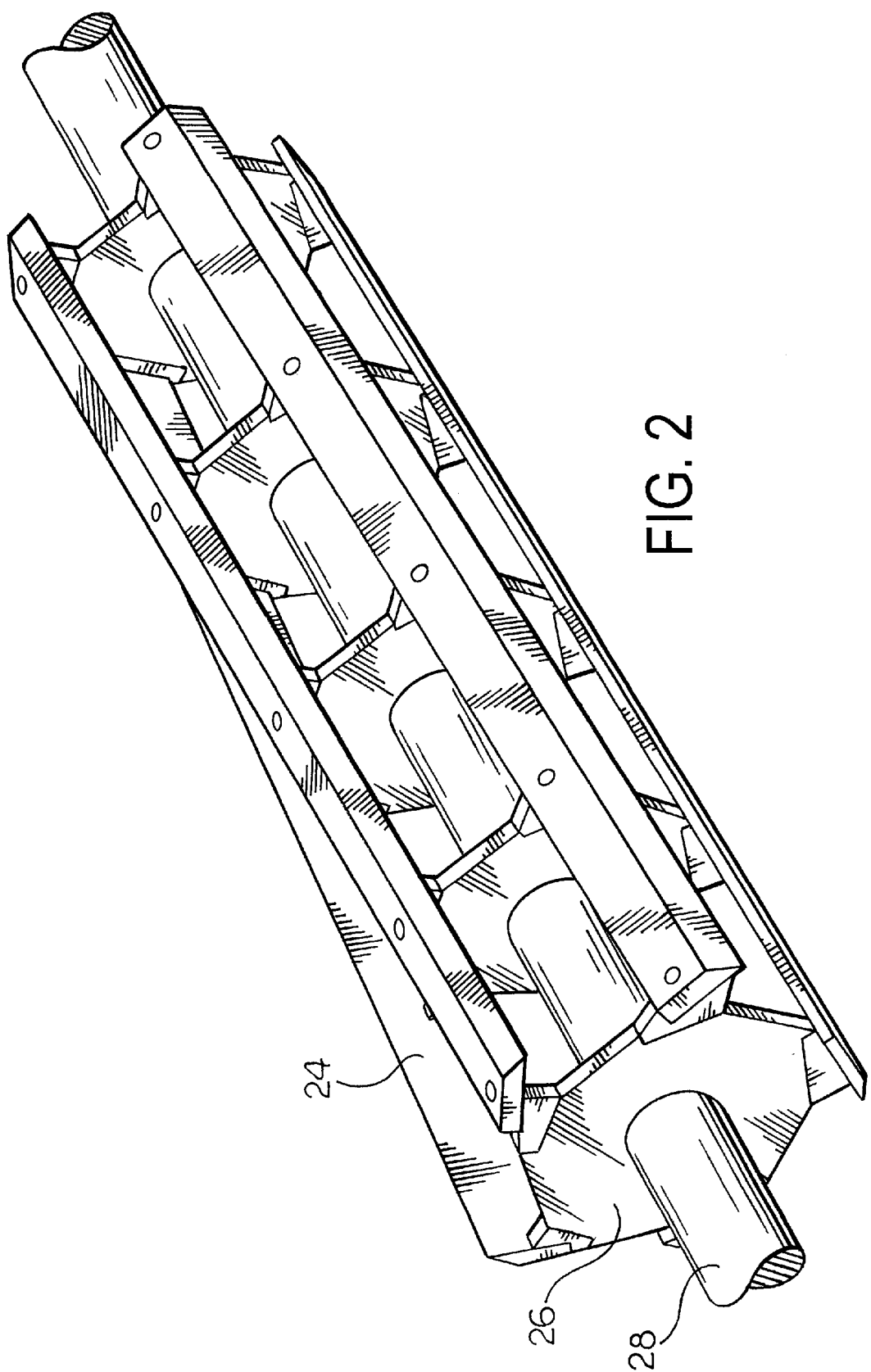

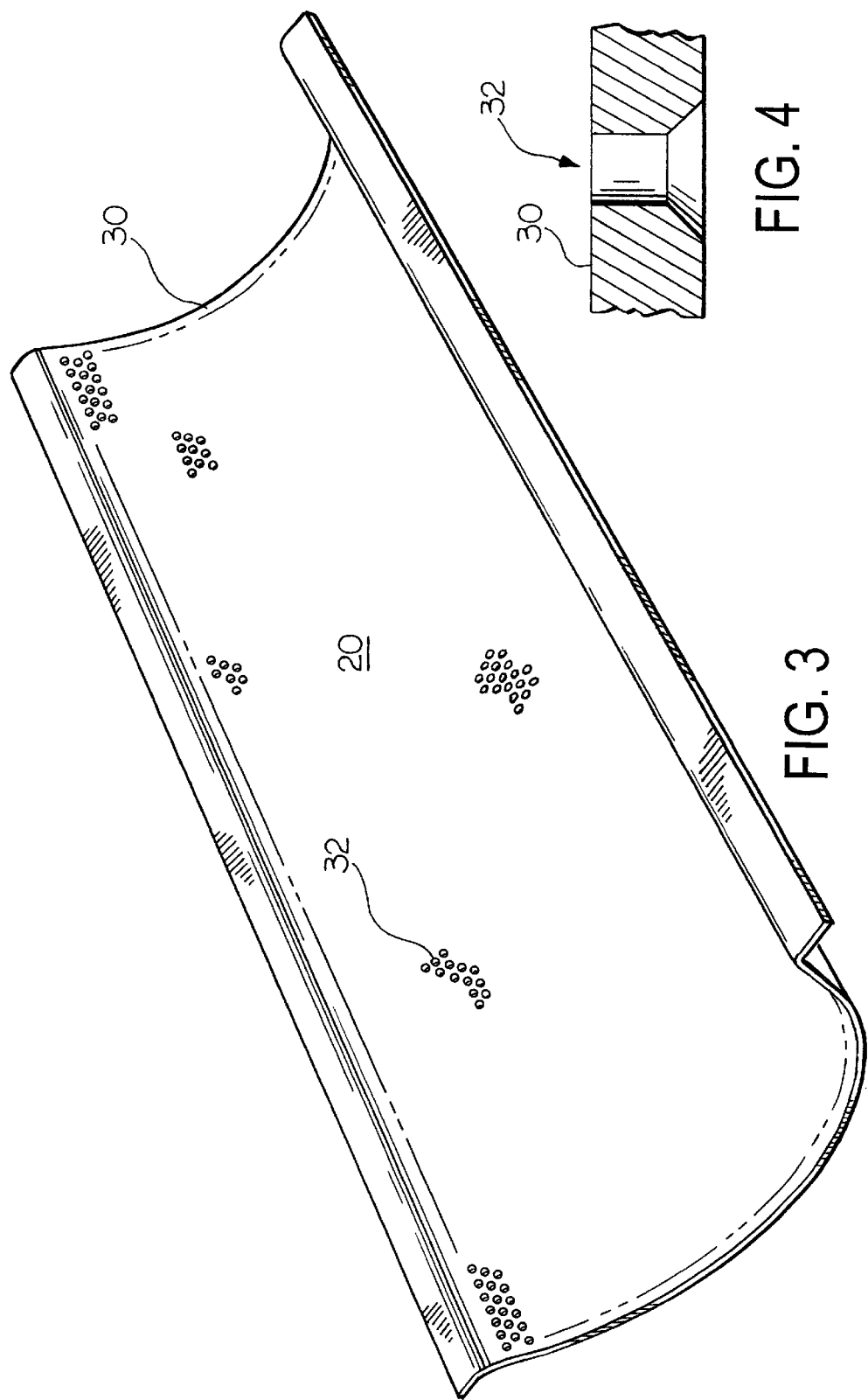

GRANULATOR

BACKGROUND OF THE INVENTION

1. Field of the Invention

Granulators are employed in the plastics industry in particular to reduce the size of the plastic particles to facilitate the removal of contaminants therefrom during the production of recycled resin such as, for example, polyethylene terephthalate PET.

2. Description of the Prior Art

Typically, the recycling process involves a two-stage process, although the process can be carried out in a single stage. The first stage involves the grinding of the material to be recycled to a nominal size of three-eighths inch (3/8"). This is accomplished by introducing the material to be recycled into a chamber of the granulator which is provided with rotating rows of knives that continue to cut the material being processed until the material is small enough to exit the first through holes in a screen in the bottom of the first stage of the process. The diameter of the holes in the screen is 3/8".

It has been found difficult to reduce the diameter of the flake being produced by merely reducing the size of the holes in the exit screen. Generally, the requirement for a smaller particle size has resulted in a reduction in the size of the holes in the exit screen, as well as an increase in the rotational speed of the cutting mechanism. These efforts have caused a number of production problems including an increased production of dust and fines which cannot be recycled. The dust and fines tend to clog the exit screens and require increased operating energy to operate the cutting mechanism. The increased usage of energy results in a build-up of heat energy which must be dissipated in order to avoid damage to the attendant equipment. It will be understood that a number of factors come into play when grinding plastic material to a small particle size. Traditional grinding requires the weight of the flake (material being treated), airflow through the granulator, and an external air moving system under the exit screen to perform a push-pull operation to get the material through the holes in the screen as quickly as possible. In the event the transit time of the material being processed increases, the material remains in the cutting chamber for longer periods of time resulting in the material being continuously cut into smaller and smaller pieces. The longer it takes for the material to transit through the cutting chamber and the exit screen, the lower the production rate, increased wear and tear on the cutting knives, and more dust and fines (unusable product) are produced. Conventional granulators and grinders and associated screens are not capable of achieving improved results because the smaller the particles become, the less pliable they become. These less pliable particles are not able to readily pass through the small holes in the exit screens.

SUMMARY OF THE INVENTION

It is an object of the present invention to produce a granulator capable of producing flake of a diameter of four (4) millimeters or less to facilitate the decontamination of the material by removal of contaminants therefrom.

Another object of the invention is to produce a granulator capable of producing small diameter flake at production rates superior to those of the prior art.

Another object of the invention is to produce a granulator for comminuted plastic material in the recycling process whereas the wear and tear in the associated cutting knives is greatly minimized.

Still another object of the invention is to produce a granulator wherein there is reduced stress on the cutting mechanism and associated exit screen.

Another object of the invention is to produce a granulator having a reduced quantity of dust and fines.

The above, as well as other objects of the invention may be surprisingly achieved in a granulator including rotary knives, associated bed knives, a rotor for carrying the rotary knives for sequential shearing action between the rotary knives and the bed knives, an exit screen allowing the passage of comminuted material less than four (4) millimeters diameter, and an air handling system creating a pressure drop across the screen to facilitate the passage of the processed material therethrough, wherein the screen is provided with a plurality of spaced apart holes.

BRIEF DESCRIPTION OF THE DRAWINGS

The above objects and advantages of the invention will become readily apparent to those skilled in the art from reading the following detailed description of the invention when considered in the light of the accompanying drawings, in which

FIG. 2 is a fragmentary perspective view of the rotor carrying the associated rotary knives as illustrated in FIG. 1;

FIG. 3 is a perspective view of the exit screen illustrated in FIG. 1 showing the disposition of the plurality of exit holes therein; and FIG. 4 is a fragmentary sectional view taken along line 4—4 of FIG. 3 showing the cross-section of the exit hole.

DETAILED DESCRIPTION OF THE PREFERRED EMBODIMENT

Figure 1:
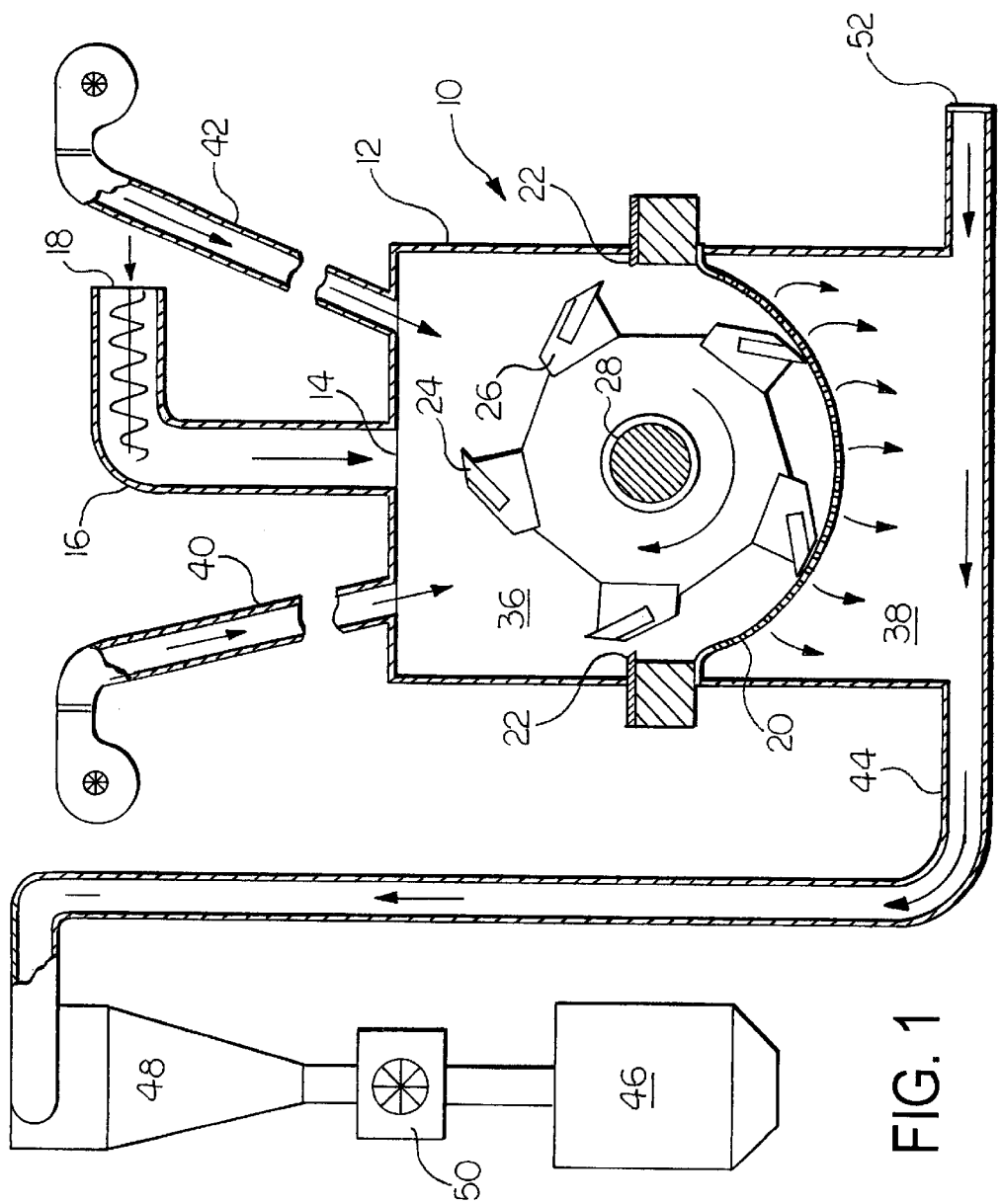
FIG. 1 is a schematic illustration of a system incorporating the features of the invention.

Referring to the drawings, there is illustrated in FIG. 1 a schematic illustration of a system utilizing the granulating principles of the present invention. More specifically, FIG. 1 shows a granulator 10 for comminuting material being processed. Generally, plastic material, specifically polyethylene-terephthalate (PET), is reground from its molded shapes into three-eighth inch (3/8") nominal flake for reuse. However, some applications require a smaller particle size in order to increase the surface area of the plastic material available for processing. The illustrated system is typically capable of achieving the smaller particle size.

The granulator 10 includes an outer housing 12. The housing 12 has an inlet 14 coupled to a supply of plastic material to be processed through an associated feed pipe 16 provided with a driven auger 18 for feeding material to the granulator 10. Typically, the material being fed to the inlet 14 by the auger 18 is plastic material which has been ground to a 3/8" nominal flake size. The material being treated is introduced into the granulator 10 through the inlet 14.

The granulator 10 is further provided with an exit screen 20, bed knives 22, a plurality of rotor knives 24 carried by radially extending arms 26 mounted on a rotor shaft 28. The rotor 28 is generally driven by an electric motor (not shown). Although the rotor 28 is illustrated as having five arms 26 in the preferred embodiment, it will be understood that there may be more or less arms. It has been found that rotor knives 24 and associated bed knives 22 of the type manufactured and sold by Nelmor Company, Inc., North Uxbridge, Mass. may be employed to satisfactorily achieve certain objectives of the invention. It will be noted from an examination of FIG. 2, the rotor knives 24 extend the full length of the knive assembly and are mounted at a slight angle in respect of the longitudinal axis of the rotor shaft 28. Such disposition of the rotor knives 24 causes the cutting edges to cooperate with the cutting edges of the bed knives 22 to create or produce a shearing action therebetween. This shearing action tends to overcome the beating or hammering of the material being treated. The material being treated is truly cut or sheared, greatly assisting in the reduction of the amount of dust or fines which might otherwise be produced. The reduction in the dust or fines greatly reduces the dust causing housekeeping problems and increases the productivity of equipment. The presence of dust and/or fines causes considerable problems in the efficient transfer of the material being treated, resulting in unnecessary energy consumption and waste.

The screen 20 is located directly below the knives 22, 24. The screen 20 is in the shape of a half cylinder 30 of sheet metal containing a large number of perforations or holes 32 as clearly illustrated in FIGS. 3 and 4. The screen 20 is positioned below the knives 22, 24 to effect the size of the granulator particles in the cutting area prior to passage through the holes 32 in the metal sheet 30 of the screen 20.

The holes 32 formed in the sheet metal 30 of the screen 20 are preferably formed with a predetermined diameter from the inlet end, closest to the cooperating knives 22, 24, to a point typically past the midpoint of the hole. The outlet ends of the holes 32 are in certain embodiments flared outwardly. The flared configuration may be achieved by counter-sinking the outlet ends of holes 32. It was found that satisfactory results are achieved by maintaining the diameter of the holes 32 greater than the thickness of the sheet 30 from which the screen 20 is fabricated. Such configuration maintains the structural integrity of the screen 20 while facilitating the flow of processed particulate material therethrough. In the preferred embodiment of the invention, the diameter of the holes 32 at the inlet thereof is four (4) millimeters.

The screen 20 divides the interior of the housing 12 into an upper cutting chamber 36 and a lower screen chamber 38.

In order to facilitate the movement of the feed, stock is delivered into the cutting chamber 36 from the inlet pipe 16 through the inlet 14, and to cause some turbulence of the material being processed, air under pressure is introduced through pipes 40 and 42. The pressurized air introduced through the pipes 40 and 42 is preferably a high volume low-pressure delivery. The high volume low pressure delivery of air to the cutting chamber 36 effectively causes movement of the feed stock being treated to facilitate the transit thereof through the cooperating cutting knives 22 and 24, and thence, through the exit screen 20.

The small particles exiting the screen 20 enter the screen chamber 38 and are drawn out therefrom through an exit pipe 44, to a storage bin 46, through a cyclone type separator 48 by an exhaust fan 50. It will be appreciated that the transit air moved by the fan 50 to a large extent enters the system through a filtered inlet 52.

The cooperative effect of the introduction of pressurized air into the cutting chamber from the pipes 40 and 42, and the air introduced into the system through the filtered inlet 52 creates a pressure drop across the screen 20 which can be controlled to effectively maximize the production of small plastic particles for use in the production of pelletized and recycled post consumer PET for direct sale and reuse back into consumer packaging applications.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. In a granulator having rotary knives, associated bed knives, a rotor for carrying the rotary knives for sequential shearing action between the rotary knives and the bed knives, a screen allowing the passage of particulates less than four (4) millimeters diameter, said screen dividing the interior of the granulator into an upper cutting chamber and a lower screen chamber, and an air handling system creating a pressure drop across the screen to facilitate the passage of particulate therethrough, the improvement comprising:

the air handling system comprising means for the introduction of pressurized air to the cutting chamber, the introduction of filtered air to the screen chamber, and the drawing of a vacuum on the screen chamber; and the screen having a plurality of spaced apart holes.

2. The granulator described in claim 1 wherein the holes in the screen have an inlet opening not to exceed four (4) millimeters diameter and the respective outlet opening is-greater than four (4) millimeters.

3. The granulator described in claim 2 wherein the holes in said screen extend from the first surface at a substantially constant diameter a portion of the distance between the first and the second surface.

4. The granulator described in claim 3 wherein the holes in said screen tend to flare outwardly as the holes approach the second surface.

5. The granulator described in claim 4 wherein said air handling system provides a high volume of low pressure air to flow through the holes in said screen.

6. A method of comminuting plastic materials comprising the steps of:

introducing particulate plastic material to a first zone wherein the material is maintained in suspended condition;

passing the suspended plastic material through a rotary cutter to reduce the size of the particulate plastic material;

directing the plastic material of reduced size to a screen having apertures therein of predetermined dimensions;

introducing pressurized air to the first zone to facilitate the passage of the plastic material through the screen and into a second zone; and introducing filtered air while simultaneously drawing a vacuum on the second zone to transport the plastic material entering the second zone to a storage zone.

7. A method of comminuting plastic materials as described in claim 6 wherein the rotary cutter reduces the size of the plastic material to particulates less than four (4) millimeters diameter.

8. A method of comminuting plastic materials as described in claim 7 wherein the apertures in the screens allow the passage of particulates of less than four (4) millimeter diameter.

* * * * *